United States Patent [19]

Bergounhon

[11] 3,975,131

[45] Aug. 17, 1976

[54] EXPANSIBLE MOLD FOR THE MANUFACTURE OF PLASTER PIECES

[75] Inventor: Rene Bergounhon, Palaiseau, France

[73] Assignee: Societe Rhone-Progil S.A., Courbevoie, France

[22] Filed: Jan. 30, 1975

[21] Appl. No.: 545,585

[30] Foreign Application Priority Data

Nov. 29, 1974 France .............................. 74.39104

[52] U.S. Cl. ............................ 425/405 H; 249/127; 249/101; 249/102

[51] Int. Cl.[2] ........................................... B29C 3/00

[58] Field of Search ................. 425/405 H; 249/101, 249/102, 127

[56] References Cited

UNITED STATES PATENTS

| | | | |
|---|---|---|---|
| 2,091,973 | 9/1937 | Fessler et al. | 425/405 H X |
| 2,172,243 | 9/1939 | Goodnow et al. | 425/405 H X |
| 2,558,823 | 7/1951 | Crowley et al. | 425/405 H X |
| 2,582,922 | 1/1952 | Crowley et al. | 425/405 H X |
| 2,583,626 | 1/1952 | Buell | 249/102 |
| 2,831,232 | 4/1958 | Lawson | 249/101 X |
| 2,871,541 | 2/1959 | James | 425/DIG. 44 |
| 3,467,354 | 9/1969 | Graham | 249/65 X |
| 3,500,513 | 3/1970 | Stanley | 425/405 H X |
| 3,529,321 | 9/1970 | Culand | 425/405 H X |
| 3,593,373 | 7/1971 | Loomis | 425/405 H X |
| 3,733,159 | 5/1973 | Coffman | 425/405 H X |

*Primary Examiner*—J. Howard Flint, Jr.
*Attorney, Agent, or Firm*—McDougall, Hersh & Scott

[57] ABSTRACT

An expansible mold for the fabrication of plaster parts having reliefs in the side walls comprising at least two walls and non-compressible deformable parts between two parallel side edges of the walls in which, under pressure, the deformable parts acquire the profile to be imparted to the molded plaster part, and which retract from the molded plaster part upon release of pressure to enable removal of the molded part without loss of a tight sealing relation with the mold.

6 Claims, 5 Drawing Figures

FIG. 4
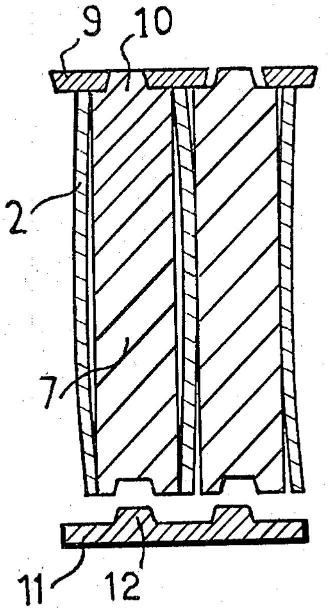
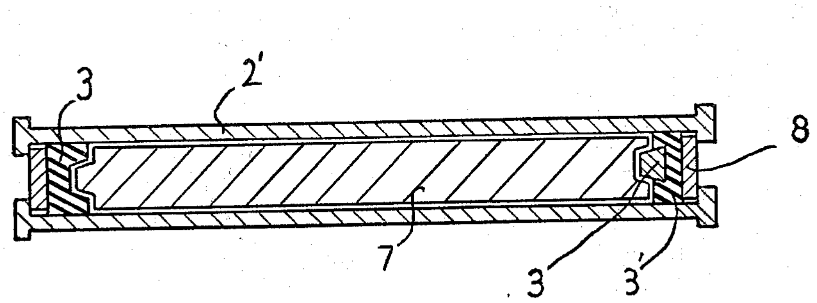
FIG. 5

EXPANSIBLE MOLD FOR THE MANUFACTURE OF PLASTER PIECES

This invention relates to an expansible mold for the manufacture of plaster pieces.

Usually the molding of plaster pieces is performed with the agency of molds which can be disassembled or have parts which are movable at the time of removal and of extraction of the piece, enabling friction on the mold walls to be avoided.

Nevertheless, the disadvantage of these molds consists principally of the fact that the assembly of the mold movable parts cannot be obtained with sufficient accuracy, thereby giving rise to dimensional deflections of the finished product.

More particularly, this inaccuracy is due to the mechanical clearances between the different movable parts and to the eventual retention within the clearance space of plaster particles which oppose mold closure.

A second process, more particularly practiced for the molding of prismatic pieces, consists in using molds equipped with fixed side walls, removable parts, for instance for the upper sides, and sliding parts for the lower sides.

After disengagement of the upper molding part, the removal of pieces can be carried out by displacing the mold bottom in the interior of the mold, for instance with the aid of hydraulic cylinders, in order to eject the plaster by extrusion towards the upper part of the mold, on the outside of this latter.

For allowance of such an operation, which requires very large stresses, it is necessary that the internal sides of the mold be quite flat, smooth, and have very great surface hardness in order to avoid any possibility of tearing up of the plaster surface and of abrasion of the mold surface.

This process, which requires molds having a very high accuracy, is proving to be extremely expensive.

In order to suppress these disadvantages, this invention has as an object an expansible mold which, although it employs relative moving parts, essentially differs from the molds which can be disassembled or having movable parts, in order to allow the free removal of the plaster product; at no time of its use is there a clearance between these parts enabling the inclusion of plaster particles that interfere with closure or impairs the accuracy of the mold.

The expansible mold, according to the invention for the manufacture of plaster pieces, having at least a side surface provided with reliefs, comprises at least two walls assembled by means of at least two incompressible deformable component parts located respectively between two parallel side edges of said walls so as to secure the tightness between these walls, each of the component parts, at the time of molding under the effect of a pressure, taking toward the inside a previously determined profile corresponding to those to be imparted to a surface of the molded article and retracting out of the contact with the molded piece at the time of stripping, after relaxation of the pressure, while drawing aside one from the other said walls between which it is located without ceasing to secure the tightness between their edges; a basis area on which said walls and the compressible component parts rest and a dischange orifice provided between the walls.

According to another characteristic of this invention, and in the case where the articles to be molded are parallelepiped and involve moldings on their side faces, both said parts involve parallel flat walls, and the two deformable component parts involve two prismatic surfaces reciprocally opposite the deformation level of the deformable component parts being determined by interposing two metal blades between both said walls, being outside the inside surface of the mold, and having a width equal to the desired thickness of the pieces to be molded.

An anbodiment of the invention will be described hereinafter by way of non-restrictive example with reference to the accompanying drawings in which —

FIGS. 1 and 2 are two horizontal sectional views of a mold used for the manufacture of plaster squares, respectively in positions of stripping (FIG. 1) or of molding (FIG. 2); and FIG. 3 is a transversal elevational view of a set of molds identical to that represented in FIGS. 1 and 2.

With reference to FIGS. 1 and 2, mold 1 on the one hand, involves two vertical and parallel walls 2 made of a material properly surface finished and without particular hardness, and on the other hand, two deformable incompressible component parts 3 made of an eleastic material having two reciprocally opposite prismatic molding surfaces 4.

More particularly these component parts 3 can be made of elastomer, for instance of neoprene or of silicone, or of any other material having similar mechanical properties.

This elastomer has the property of being able to collapse in a direction (arrow 5) under the effect of a force applied in the same direction.

Owing to the fact that this elastomer is incompressible, volume remains constant and the dimensional loss resulting from this collapse in the direction of arrow 5 is obtained with a directional increasing along the arrow 6.

The invention makes use of this property of the elastomer for enabling the removal of plaster pieces, the elastomer being subjected to a pressure at the time of casting the plaster and then relieved from any mechanical stress at the time of removal.

Such as represented in FIG. 2, the mold 1 is in molding position and the two internal faces of the walls 2, onto which the collapse forces of the elastomer are applied, are held in spaced relation at the thickness of the plaster square 7 through the medium of two metal parts 8 arranged in edges between the said walls.

The component parts 3, compressed between the walls 2 of mold 1, in this state of deformation, have molding surfaces 4, enabling the side molding of plaster square 7 to be obtained.

The removal of the plaster square is obtained by causing the release of the side collapse forces on walls 2 and consequently on the component parts 3.

This release causes simultaneously a gap between the walls 2 and the plaster and, in consequence of the retracting of elastomer component parts 3, the gap of surfaces 4 delineating the square thickness 7 (FIG. 1).

Then square 7 can be evacuated freely without stress, without friction upwards or downwards, without any draw (draft given to the mold walls to eject), and without gaps occurring for enabling the inclusion of particles which might subsequently be detrimental to the following molding positionings.

With reference to FIG. 3 representing partially a set of molds 1 mounted in parallel in which the walls 2 internal to the set are common to two adjacent molds, the molding of the upper parts of squares 7 is carried out with the agency of molding component parts 9 fixed on the side edges of walls 2, reserving openings 10 for the casting, the surface of squares corresponding to the openings 10 which can be obtained by leveling. The molding of the lower part of square 7 is obtained with the agency of a bottom 11 having moldings 12 for each of the molds 1 and on which the walls rest, this bottom being integral with a fixed base or even with the ground.

This arrangement of molds 1 makes evident an important advantage of the invention relating to the handling of plaster squares 7 immediately after removal. According to the currently employed processes, after removal it is known that it is necessary to carry out the conveying of the squares up to a withdrawal station, storage station, drying station or a further storing station. This transport is particularly difficult owing to the fact that just on the time of removal, the setting of the plaster has not been completed and the squares afford little mechanical strength. Consequently, it often happens that the plaster squares are deteriorated during such conveying.

This disadvantage is particularly aggravated in the case where there are used non-homogeneous plasters whose setting time can vary considerably from one square to the other. Effectively for a same molding time, frequently the squares from a same casting are not all transportable.

This invention eliminates this disadvantage. It avoids the use of any gripping means of the squares such as handling pliers or the like, and enables ejection of squares having very poor mechanical strength.

Thus it fits in with automation and permits very high molding shot capacities to be obtained, even by using non-homogeneous plasters, more particularly of phosphogypsum.

According to an advantageous property of the invention, for this purpose there is carried out the transport of the whole molds themselves in which the squares are partially hermetically sealed, the removal of the internal side of the squares occurring at the time that the set of molds is raised in the first phase of conveying, owing to the fact that the bottom 11 is fixed.

When said set of molds 1 has been brought to the withdrawal station, removal occurs by suppressing the forces which keep the component parts 3 compressed by lifting the molds from the loosened squares 7, before returning the molds to the molding area. During this operation, the extraction of squares occurs through the lower part of the mold which remains open in the absence of bottom 11.

Of course, in the case where the set of molds 2 comprises a plurality of parallel running molds, as represented in FIG. 3, the compression of component elements 3 can be achieved by exerting a pressure on both walls outside the set of molds, thus entailing the deformation of said component parts 3.

It is advisable to specify that the invention is not restricted to the use of component parts 3 made of elastomers or of materials which are deformable, incompressible and elastic.

These component parts 3 can be replaced by devices enabling the same results to be obtained.

By way of example, these component parts can involve a sealed jacket made of plastic having a molding surface filled with a non-compressible fluid or some more with small-sized hard balls.

The invention also includes a component part 3 in which both spacing operations (spacing of its own molding surfaces and spacing of both walls 2) are independent. Such a component part 3 can be achieved with the agency of two sealed jackets, each coupled with a hydraulic or pneumatic device, one of these jackets bearing the molding surface and the other jacket used only for obtaining the gap between walls 2 and plaster. The operating of the hydraulic or pneumatic device is such that:

- for the molding, the molding surface bearing jacket is set under pressure whereas the second jacket is under low pressure;

- for the removal, the second jacket is subjected to a pressure whereas the first jacket is under low pressure.

It is noticeable that this system allows spacings of molding surfaces greater than previously to be obtained.

Lastly, the component part 3 can be composed of a mechanical device enabling to achieve simultaneously the spacing of the molding surfaces 4 and of the walls 2 under the effect of a pressure, for instance of a hydraulic or pneumatic cylinder.

However, at the time of removal, more particularly owing to the fact of the pressure of a water skin between the flat surfaces respectively opposite of the mold and of the molded piece, it happens that this latter separates only on one side from the mold and clings on the other side onto one wall of this latter. Then it is difficult to loosen the piece from this wall of the mold without deteriorating the plaster and such that the elastic component part of which a projection is engaged into the groove or slot it has conformed, then exerts a dissymetrical pressure on both flanks or edges of this hollow part which, having a reduced thickness, consequently splits or breaks, as observed on a number of squares.

An alternate method applied to the mold consists in the fact that the mold walls assembled by means of two deformable component parts are composed of plates becoming flat under the pressure effect exerted on said walls, enabling the mold to take its molding position and taking a non-flat shape when the mold is no longer subjected to the effect of these pressures at the time of removal.

To this latter alternate method of this invention, there is appended preferably a second means cooperating with the first and enabling avoidance of an injurious defect of the edges of the side faces having a middle recess of the plaster molded piece, conformed by the deformable component parts when, at the time of removal, a non-symmetrical pressure is exerted at the time of relaxation of the deformable component part on edges having a reduced thickness of the recesses of the side faces of said molded piece. Effectively it is beneficial to insert a rigid piece into the deformable component part contributing to the conformation of side faces, having a middle recess, without substantial elasticity, the part of which projecting out of the deformable component part has the profile of the recess desired.

An embodiment of this invention comprising these alternate methods is described hereinafter with the only purpose to illustrate the same. This description, performed with reference to the accompanying drawings, cannot be considered as a limitation of the scope of the invention.

FIG. 4 is a vertical section of a mold according to one of the alternate methods, represented at the time of removal.

FIG. 5 is a horizontal section of the same mold in the same phase of the manufacture showing another alternate method.

Figure 1:
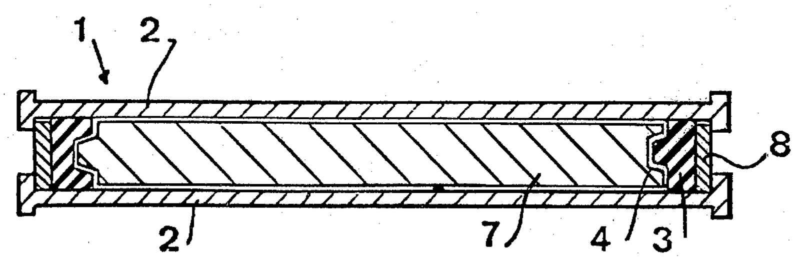
Figure 2:
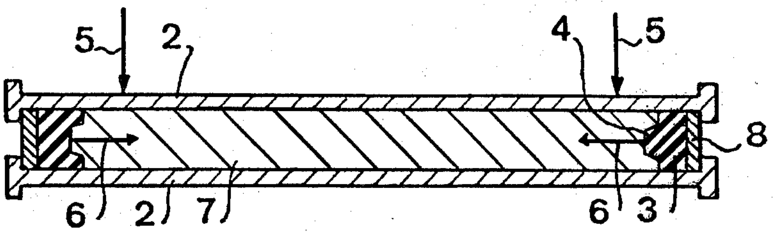
Figure 3:
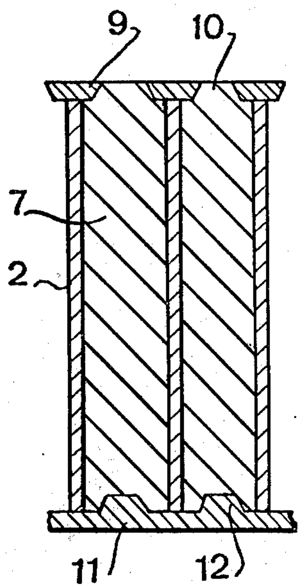

Two substantially vertical walls 2' rest on a horizontal bottom 11, eventually fixed on a framework or the ground of a work-shop, and equipped with desired reliefs 12 during the molding operation here represented in their equilibrium state without external stress at the time of stripping. The curvature of these walls is largely exaggerated, but is really hardly detectable with the naked eye. Metal parts 9, which are to be mounted on the upper edge of walls 2', give the desired shape to the upper dihedrons of the squares; a casting hole 10 is relieved between these parts for enabling the casting of the tempered plaster which spreads into 7.

In FIG. 5 the walls 2 can be seen, the molded piece 7, the deformable component parts 3 and 3' of which one 3 has a recess whereas in the other 3' is inserted a rigid piece, for instance made of polished metal 13 whose external shape corresponds to that of the groove it has to conform; metal blades 8 are used as thrust for component parts 3 and 3' and maintain the interval between the walls 2' at the time of removal.

Of course, the separate molds represented can be coupled in series as has been heretofore described, each mold being common to two adjoining molds, except those arranged at the ends of the set. The whole of the alternate methods or a part of the same described previously can be embodied in the improved mold of the present invention.

For performing the plaster molding, the molds are placed on their bottom 11 and on at least one of the walls there is exerted a pressure sufficient to bring the initially bent walls 2' to a fairly perfect even plane, their spacing and their position being maintained by the bottom 11 and the different parts 9 and 8. This pressure can be exerted in a fairly homogeneous manner by a hydraulic or pneumatic transmission on a rigid flat plate (not represented) having a surface fairly equal to these of walls 2. These walls, such as represented in the figures, are bent. The sagitta corresponding to the greatest distance between a point of the concavity of the bend and the position of the same point when the plane shape is obtained, is in the range of 1/1000 of the large sizes, that is to say, in general, of the flat faces of the piece to be molded or in other words for squares having usual sizes from 3/10 to 8/10 of millimeter. These walls can be performed by disposing on an iron framework, two sheet iron plates having at least a smooth surface and separated one from the other by a filling having a constant thickness. At least two of the sides opposite of the framework are bent. By becoming flat under the effect of the pressure, these walls quash the deformable pieces and make them spread in the only direction without hindrance, that is to say towards the interior of the mold. Then the plaster is cast, and afterwards when a sufficient degree of setting has been obtained to make it non-deformable under the effect of its own weight, for instance the mold or the set of molds is carried on the area where the squares have to be dried; afterwards the pressure is no more exerted, then the deformable component parts, by returning to their initial shape, push aside the walls which at the same time incurvate by allowing the air to penetrate between them and the plaster. The rigid inserted part 13 follows the general shrinkage direction in a translation according to the axial plane of the groove formed without exerting a dissymetrical pressure on one or the other of the sides of this groove even if one of the vertical walls returns to its equilibrasion shape more rapidly than the other or if a local adherence occurs.

Preferably the thickness of the walls is selected in such a way that there is the necessary spacing between these squares for securing their drying by air circulation propelled by an impeller thus being made without difficulty by single vertical displacement of the mold.

For instance this spacing is in the range from 20 to 30 mm for squares of 30 mm in thickness.

I claim:

1. A mold for the production of plaster parts comprising at least two mold walls normally spaced one from the other in open position by an amount greater than the spaced relation between said walls when defining the mold space, at least two incompressible but deformable components positioned between outer ends of the said walls in sealing engagement therewith, a feed opening communicating with the mold space for the introduction of plaster material to be molded, rigid spacers between outer ends of said walls immediately adjacent the outer ends of the deformable components having a width less than the width of the deformable material and positioned to be engaged by said walls to define the mold space therebetween, a pressure means operative on at least one of said walls for displacement under pressure in the direction towards the other to define the walls of the mold space upon engagement with said spacers whereby the deformable, incompressible components are deformed in the direction towards the said mold walls and expanded in the space between the said mold walls to define the end walls of the mold space therebetween and which, in response to release of pressure return to normal position between said walls by expansion in the direction between the mold walls to displace the mold walls in the direction away from each other to open position while retracting lengthwise between the mold walls to release the article molded in the mold space.

2. Expansible mold according to claim 1, characterized by the fact that the above mentioned deformable component parts are made of a non-compressible elastic material and that the deformation of said component parts is obtained by squashing by means of a force acting on said parts.

3. Mold according to claim 1 for the production of plaster squares, characterized by the fact that two walls are flat and parallel.

4. Molds as claimed in claim 1 which comprise a set of molds in which said molds are arranged in series, with the parts located in the inside of the said set common to two adjacent molds.

5. Expansible mold for the manufacture of plaster pieces according to claim 1, characterized by the fact that the mold walls are composed of curvilinear plates which become planar when displaced under pressure to define the mold space and returns to curvilinear shape upon return to open position.

6. Expansible mold for the manufacture of plaster pieces according to claim 1, which includes a rigid part present as an insert in the deformable component part, said rigid part projecting outside of this component part towards the interior of the mold whose profile corresponds to that of the recess to be molded in the plaster piece.

* * * * *